United States Patent [19]

Takatsu et al.

[11] Patent Number: 5,166,873
[45] Date of Patent: Nov. 24, 1992

[54] PROCESS CONTROL DEVICE

[75] Inventors: Haruo Takatsu; Kinichi Kitano, both of Tokyo, Japan

[73] Assignee: Yokogawa Electric Corporation, Tokyo, Japan

[21] Appl. No.: 575,211

[22] Filed: Aug. 30, 1990

[30] Foreign Application Priority Data

Sep. 13, 1989 [JP] Japan ................................ 1-238222
Sep. 26, 1989 [JP] Japan ................................ 1-249927

[51] Int. Cl.$^5$ ............................................. G05B 13/04
[52] U.S. Cl. ................................... 364/151; 318/561;
364/158; 364/161; 364/177
[58] Field of Search ............... 364/148, 149, 150, 151,
364/157, 158, 159, 164, 165, 160-163, 176, 177;
318/561, 609, 610, 632

[56] References Cited

U.S. PATENT DOCUMENTS

| | | | |
|---|---|---|---|
| 3,601,588 | 8/1971 | Bristol, II | 364/151 |
| 3,767,900 | 10/1973 | Chao et al. | 364/151 |
| 3,828,171 | 8/1974 | Griffin | 364/151 X |
| 4,195,337 | 3/1980 | Bertrand et al. | 364/151 |
| 4,213,175 | 7/1980 | Kurihara | 364/151 X |
| 4,607,325 | 8/1986 | Horn | 364/151 |
| 4,791,548 | 12/1988 | Yoshikawa et al. | 364/151 X |
| 4,975,827 | 12/1990 | Yonezawa | 364/151 |

Primary Examiner—Joseph Ruggiero
Attorney, Agent, or Firm—Moonray Kojima

[57] ABSTRACT

A manipulated variable to be applied to a process and a process variable, are gathered by data gathering apparatus. In a modeling apparatus, which includes a process model, internal parameters thereof are adjusted so that an output of the process model may match the process variable. Accuracy of the process model is calculated by an estimation accuracy operating apparatus. The modeling apparatus is started when the manipulated variable or process variable changes to become larger than a fixed value, and control constants are derived from the outputs of the modeling apparatus and the estimation accuracy operating apparatus. The gain constant of the process model is determined by the output of the process model and the process variable. The internal parameters are searched by a simplex method wherein the length of the component side which comprises an initial polygon is made longer than the sampling period of the data gathering apparatus and a simplex is remade at least once at the original coordinates when the parameters are settled by a one time simplex method. At the beginning of control a step like manipulated variable is applied to the process, and based on the response to the process variable at this time, initial values of a sampling period and control constants are obtained.

7 Claims, 21 Drawing Sheets

Non-Integral type process

Integral type process

PROCESS CONTROL DEVICE

BACKGROUND OF THE INVENTION

1. Field of the Invention

This invention relates to a process control device which controls a process; and more particularly, to such a device which functions to automatically adjust control constants, such as a proportional constant (P) and an integral constant (I), to optimum values; and still more particularly, to such a device having an internal process model to estimate the dynamic characteristics of a process to be controlled, wherein PI operation parameters are determined by the process model based upon an estimated result.

2. Description of the Prior Art

In order to exert optimum control of a process, it is necessary to search the dynamic characteristics of the process and calculate the control operation parameters and use such parameters for calculation of the manipulated variables. These process control devices may before example, an open loop type, a limit sensitive type, a response waveform type, an adaptive control type, and a type equipped with a process model. FIGS. 1 to 5 are block diagrams depicting conventional process control devices.

FIG. 1 depicts a conventional process control device of the open loop type, wherein in a normal control state, switch 1 is connected to the control operation means side 2. Both set value SV and process variable PV are inputted to deviation operation means 3 wherein the deviation between the inputs is calculated. The deviation signal is inputted to control operation means 2 in which manipulated variable is calculated by using a PID operation parameter, and the obtained manipulated variable is outputted to process 4.

Switch 1 is periodically connected to identification signal generator side 5, or when the deviation becomes large, and a step signal, such as a pulse signal, is outputted from identification signal generator 5 to process 4 as an identification signal. Based on the response from process 4, control operation parameters are calculated in accordance with the Ziegler-Nichols method, etc, and set to control operation means 2.

FIG. 2 shows a conventional process control device of the limit sensitivity type, wherein a deviation signal from deviation operation means 3 is applied to control operation means 2 and limit cycle generator 6. Adding means 7 adds the outputs of control operation means 2 and limit cycle generator 6, and generates an output signal which is applied to process 4 as a manipulated variable.

Limit cycle generator 6 functions to change the manipulated variable outputted to process 4 to a maximum value and to a minimum value, periodically. Based upon the limit cycle or limit sensitivity at that time, the control operation parameters are calculated in accordance with the Ziegler-Nichols method, etc., and is set to control operation means 2.

FIG. 3 depicts a conventional process control device of the response waveform type, disclosed for example U.S. Pat. No. 4,602,326, wherein to response waveform rule applying means 8, a set value SV and a deviation DV are applied. Response waveform rule applying means 8 is configured by such tuning rules as Fuzzy rule, etc. Control operation parameters are obtained by applying these rules to the overshoot of the process quantity, the attenuation ratio, the attenuation period, etc, and the obtained parameters are set in control operation means 2.

FIG. 4 depicts a conventional process control device of the adaptive control type, wherein adding means 10 adds the output of control operation means 2 and the output of identification signal generator 9, and generates an output which is applied to process 4. Dynamic characteristic identification means 11 receives process variable PV from process 4 and the output from adding means 10, estimates control operation parameters, and sets the estimated parameters in control operation means 2. That is, a very small disturbance is generated in identification signal generator 9. The control operation parameter is obtained from the dynamic characteristic of the process variable PV at that time and the thus obtained result is set in control operation means 2.

FIG. 5 depicts a conventional process control device of the type equipped with a process model, such as disclosed in ISA Transaction Vol. 22, No. 3, p. 50,51; and U.S. Pat. No. 4,385,326, wherein a signal from control operation means 2 is outputted and applied to process 4 and also applied to process model 13 through a high pass filter 12. Process model 13, modelling process 4, is so configured that its parameters can be changed. Difference operation means 15 calculates the difference between the signal applied from process 4 through high pass filter 14 and the signal applied from process model 13. Model parameter search means 16 receives a difference signal from difference operation means 15, and searches parameters that make the difference signal minimal. The searched parameters are set as the parameters of process model 13. Based on the parameters searched by model parameter search means 16, control operation parameters are obtained, and the obtained control operation parameters are set in control operation means.

The above discussed conventional devices have a variety of problems. For example, the open loop device of FIG. 1 and the adaptive control device of FIG. 4 must provide identification signals to the process, and the limit sensitivity device of FIG. 2 must generate persistent oscillations. In these types of devices, disturbance is applied to the process. Thus, when the control constant is obtained while the process control device is in operation, many restrictions apply.

Moreover, in the response waveform device of FIG. 3, the waveform must be observed several times until the control operation parameters are settled, and hence, a certain time period is required.

Accordingly, in the foregoing control devices, the control operation parameters cannot be freely set.

Furthermore, in the device equipped with the process model, and shown in FIG. 5, the calculation is carried out continuously by model parameter search means 16. Thus, the amount of calculation increases as a whole. As a result, the load of a microprocessor used therewith becomes heavy when the function of each part is executed in accordance with a program installed in the microprocessor.

SUMMARY OF THE INVENTION

An object of the invention is to provide a process control device wherein control constants can be reset in a short time without producing disturbances in the process.

Another object is to provide a process control device wherein the amount of calculation is reduced and the load of the microprocessor is minimized.

DETAILED DESCRIPTION OF PREFERRED EMBODIMENTS

Figure 6:
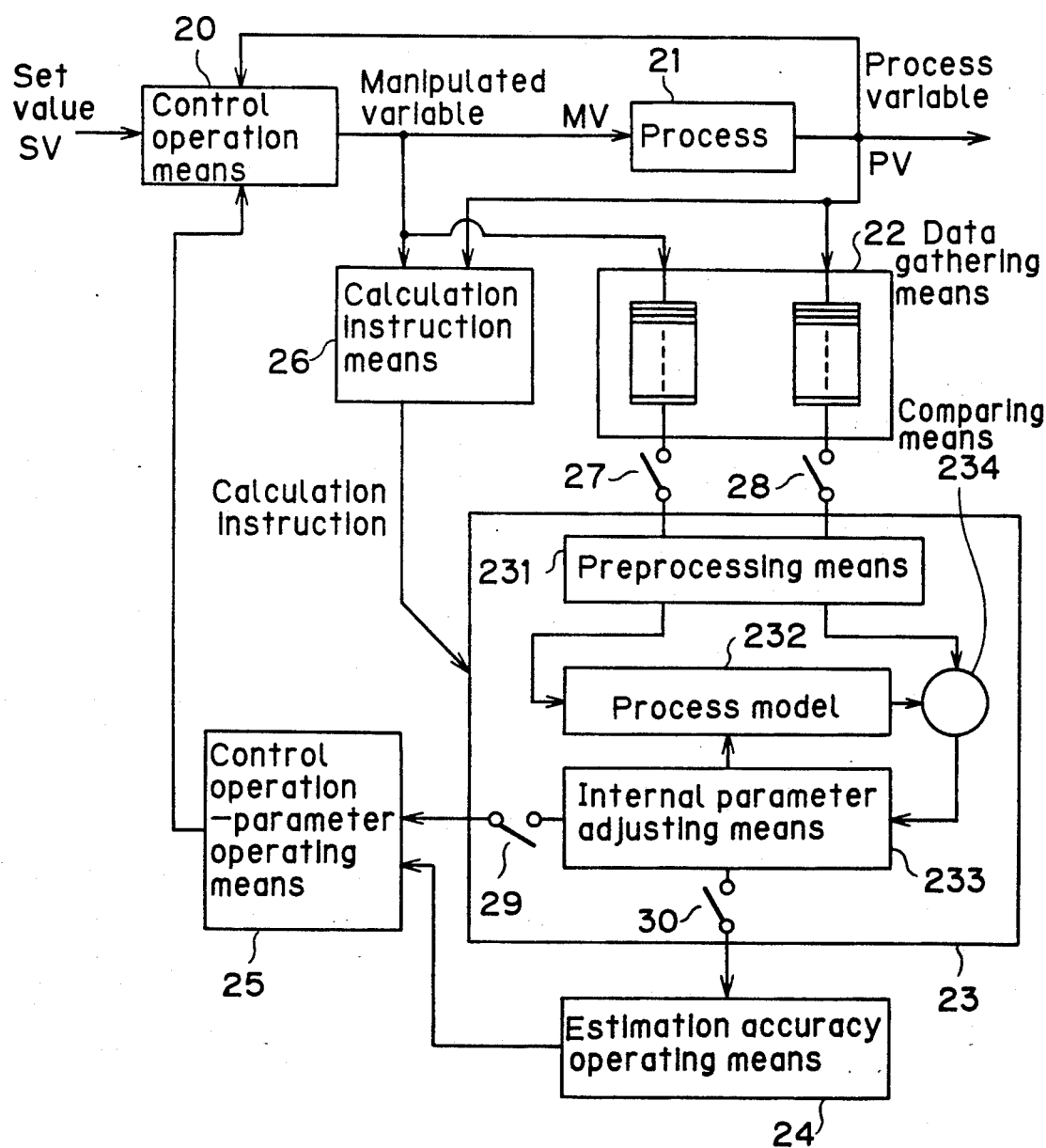
FIG. 6 is a structural diagram depicting an illustrative embodiment of the invention.

FIG. 6 depicts a control operation means 20, to which set value SV, as a desired value, and process variable PV, which is the output from process 21, are inputted. In control operation means 20, operation, such as proportional operation (P), integral operation (I), or differential operation (D),is applied to the difference between set value SV and process variable PV so as to obtain manipulated variable MV.

Manipulated variable MV which is the output from control operation means 20, is applied to process 21, which is thereby controlled. Process 21 generates and outputs process variable PV.

Data gathering means 22 receives manipulated variable MV and process variable PV. These data are held as time series data for a predetermined period and then outputted.

Modeling means 23 comprises preprocessing means 231, process model 232, internal parameter adjusting means 233 and comparing means 234. Preprocessing, such as filtering, is applied, at preprocessing means 231, to the outputs , such as manipulated variable MV, and process variable PV, which were held and applied by data gathering means 22 through switches 27,28. Then, manipulated variable MV is inputted to process model 232, and process variable PV is inputted to comparing means 234. Process model 232 simulates process 21. The output from process model 232 is inputted to comparing means 234, and compared therein with process variable PV which is separately applied from preprocessing means 231. This comparison result is inputted to internal parameter adjusting means 233 which functions to adjust the internal parameter in process model 232 so that the output of process model 232 may match the output of process 21.

Estimation accuracy operating means 24 receives the output from internal parameter adjusting means 233 of modeling means 23 via switch 30 and calculates the accuracy of process model 232. Control operation parameter operating means 25 receives the outputs from internal parameter adjusting means 232 via switch 29 and estimation accuracy operating means 24 and calculates the control parameters based on the output thereof and outputs such control parameters to set control operation means 20. Control operating means 20 calculates the manipulated variable MV based on this new control parameter.

Calculation instruction means 26 receives process variable PV and manipulated variable MV and generates an output which is used to manipulate switches 27–30 when changes of the inputs PV and MV exceed a predetermined value. Based on this, a calculation instruction signal is supplied to modeling means 23 so as to cause modeling means 23 to start operation.

Figure 7:
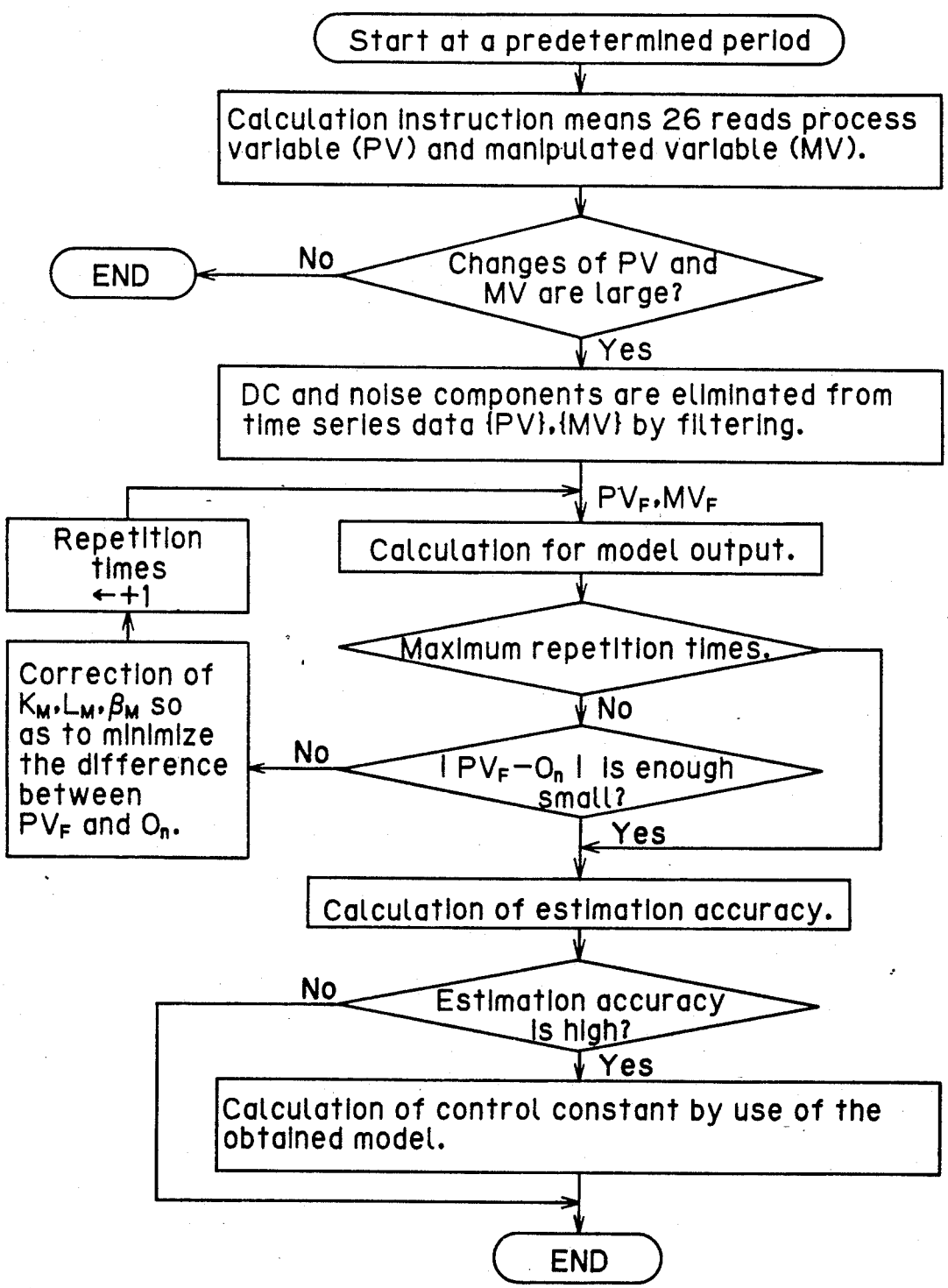
FIG. 7 is a flow chart for explaining the operation of the FIG. 6 embodiment.

The operation of FIG. 6 is described with reference to FIG. 7, wherein data gathering means 22 gathers manipulated variable MV and process variable PV as time series data at a prescribed period without any relation to the modeling operation. Calculation instruction means 26 reads process variable (PV) and manipulated variable (MV) during every predetermined period and functions to judge whether the changes are larger than a predetermined value. If the change is less than the predetermined value (i.e. NO), the operation ends without giving any calculation instructions.

Figure 8:
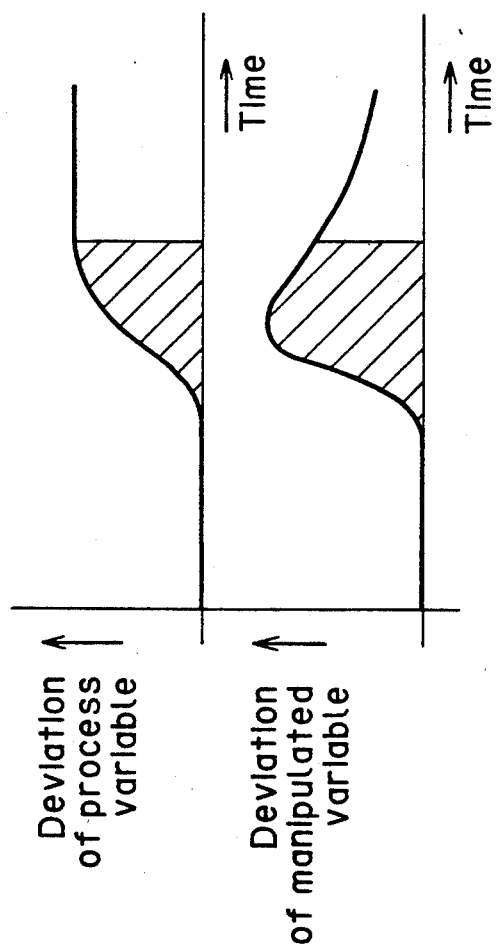
FIGS. 8 and 9 are diagrams depicting characteristic curves for explaining operation of the embodiment of FIG. 6.

For example, this judgment is derived from such calculation, as shown in FIG. 8, that the shaded area is calculated by integrating the deviation of the process variable and the manipulated variable from respective steady states.

When the change is larger than the predetermined value (i.e. YES), modeling means 23 reads the time series data {PV} concerning process variable PV and time series data {MV} concerning manipulated variable MV gathered by data gathering means 22. Preprocessing means 231 serves to eliminate the DC component and the noise component by filtering.

This filtering is given by the following equation (1),wherein is the time series data of the process variable; $PV_O$ is the DC $PV_F$ or noise component; and $a$ is the filtering constant.

$$PV_F = (l-a) \cdot PV_F + a \cdot (PV - PV_O) \tag{1}$$

Filtered time series data $PV_F$, $MV_F$ concerning the process variable and the manipulated variable, respectively, are applied to process model 232 in which calculation of model output is carried out.

Although this calculation is different from the process model, assume that the n time model output is $O_n$, then the above calculation is given by the following equation (2), wherein $L_M$ is the dead time of the process model; $\beta_M$ is the first order lag coefficient of the process model; $MV_F(n-L_M)$ is the factor obtained by calculation using value $MV_F$ before time $L_M$; $K_M$ is gain of the process model, $$O_n = \beta_M \cdot O_{n-1} + (1-\beta_M) \cdot K_m \cdot MV_F(n-L_m) \qquad (2)$$

This calculation is repeated until the repetition number reaches the maximum value (i.e. YES), or until output $O_n$ of the process model becomes sufficiently close to time series data $PV_F$ concerning the process variable (i.e. YES).

Figure 9:
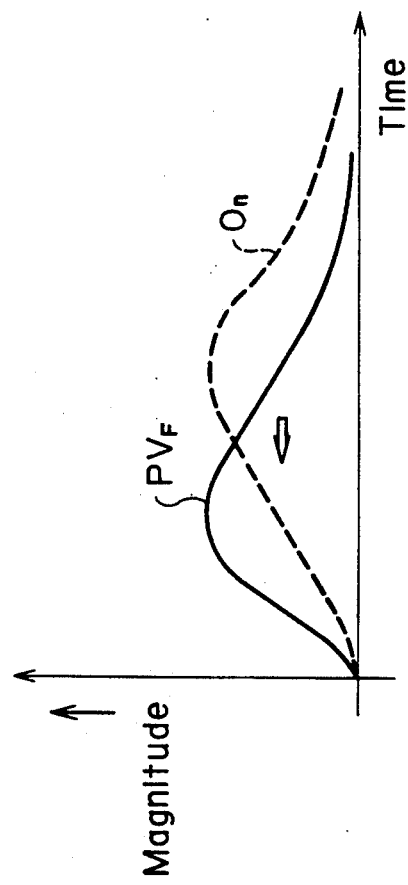

When the repetition number does not reach the maximum value, (i.e. NO), or when the difference between output $O_n$ of process model 232 and time series data $PV_F$ concerning the process variable is not small (i.e. NO), as shown in FIG. 9, gain $K_M$, dead time $L_M$, and first order lag coefficient $\beta_M$ are adjusted so that this difference becomes small (that is, to cause the curve of output $O_n$ to move in the direction of the arrow), and then process model 232 is re-started.

When the repetition reaches the maximum number, (i.e. YES), or when the difference between output $O_n$ of process model 232 and time series data $PV_F$ concerning process variable becomes sufficiently small (i.e. YES), accuracy K of process model 232 is calculated by estimation accuracy operating means 24. This accuracy K is calculated, for example, by the following equation (3) or (4).

$$K = 1 - [\Sigma\{PV_F(i) - O(i)\}^2 / \Sigma PV_F(i)^2] \qquad (3)$$

$$K = \Sigma\{PV_F(i)\}^2 / \Sigma\{O(i)\}^2 \qquad (4)$$

wherein $PV_F(i)$ is the time series data of the process variable at time i; and O(i) is the output of process model 232 at time i.

When the estimation accuracy is not as high as a predetermined value (i.e. NO), the operation ends.

On the other hand, when the estimation accuracy is higher than the predetermined value (i.e. YES), control operation parameter operating means 25 calculates protion/integration/differentiation constants, that is the control operation parameters, by using the Ziegler-Nichols method, based on the obtained process model 232 of the first order lag process model.

Control operation means 20 calculates manipulated variable MV by using the newly obtained control operation parameter.

The process model is not necessarily a first order system, such as shown by equation (2). Furthermore, when there exists a measurable disturbance, such as load fluctuation, in process 21, the disturbance can be used for the model calculation.

In the embodiment of FIG. 6, calculation must be made repeatedly with respect to the entire set of internal parameters of the process model 232, that is, gain $K_M$, dead time $L_m$, first order lag coefficient $\beta_M$, by changing slightly these values and thus calculation time can be lengthy. In the FIG. 10 embodiment, gain $K_M$ is calculated based on the integration ratio of the process variable and the output of the process model when the process gain is made to be 1, and dead time $L_M$ and first order lag coefficient $\beta_M$ are obtained by a repetition search method. This reduces the calculation time.

Figure 10:
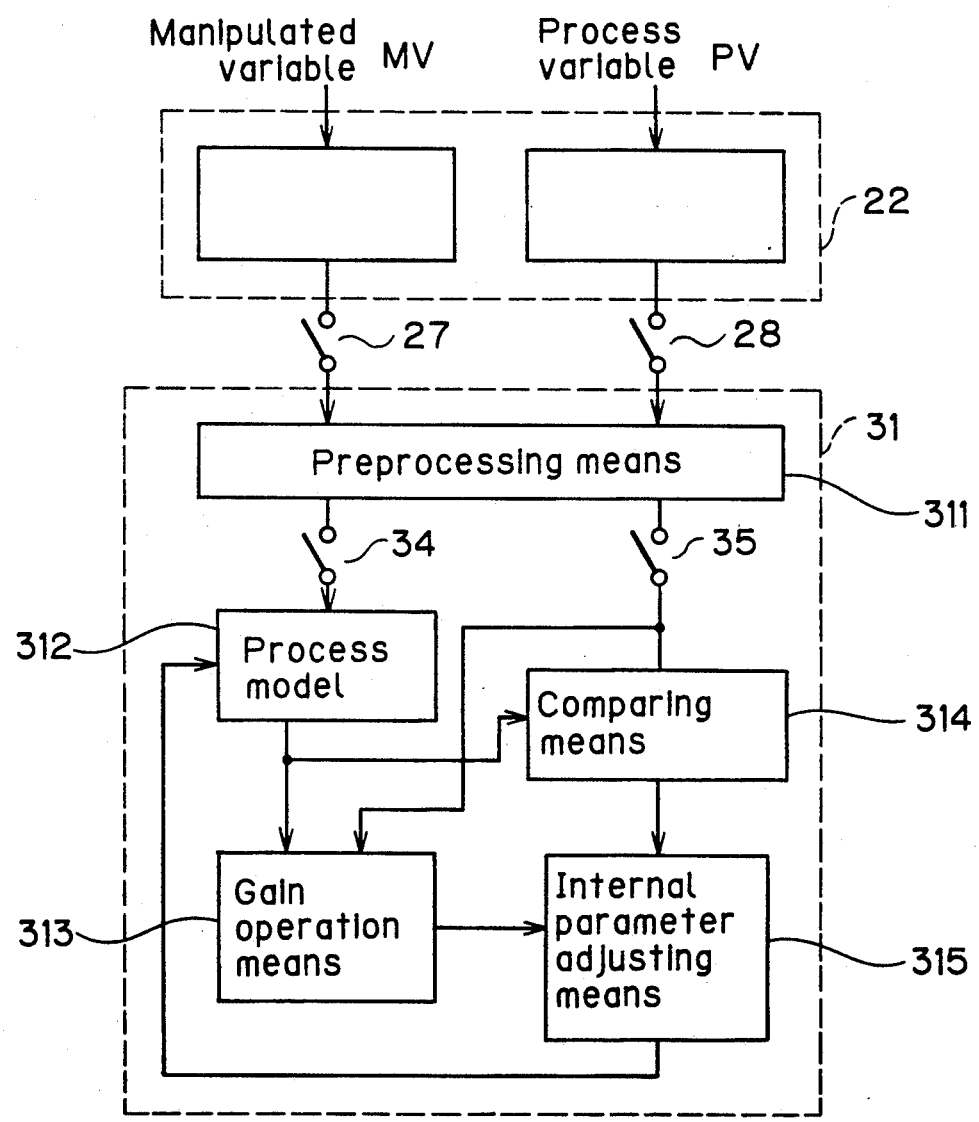
FIGS. 10 and 11 are diagrams which depict the configuration and operation of another illustrative embodiment of the invention.

In FIG. 10, portions other than the modeling means and data gathering means 22, are omitted since these omitted portions are the same as in FIG. 6.

Modeling means 31 has a similar function to modeling means 23 of FIG. 6 and comprises preprocessing means 311 which has a similar function to preprocessing means 231 of FIG. 6, namely, process variable PV and manipulated variable MV stored in data gathering means 22 are applied via switches 27,28 to preprocessing means 311 and are filtered thereby so as to eliminate the DC component and the noise component.

Process model 312, which simulates the real process, is similar to process model 232, and receives via switch 34, the manipulated value MV preprocessed by preprocessing means 311, and the output from internal parameter adjusting means 315, and generates an output. Gain operation means 313 receives the output signal from process model 312 and process variable PV via switch 35 and calculates the gain of process model 312 and generates and output signal Comparing means 315 compares the output from process model 312 and process variable PV applied via switch 35, and generates an output. Internal parameter adjusting means 315 receives the output from comparing means 314 and the output from gain operation means 313, and changes the internal parameters so that the difference between the output from process model 312 and the process variable PV will be sufficiently small.

The output from internal parameter adjusting means 315 is applied both to the estimation accuracy operating means 24 and control operation parameter operating means 25 of FIG. 6 in a manner similar to the FIG. 6 embodiment so as to obtain control operation parameters which are applied to control operation means 20 and used thereby in the control operation. Switches 27,28,34 and 35 are controlled by calculation instruction means 26 of FIG. 6.

Figure 11:
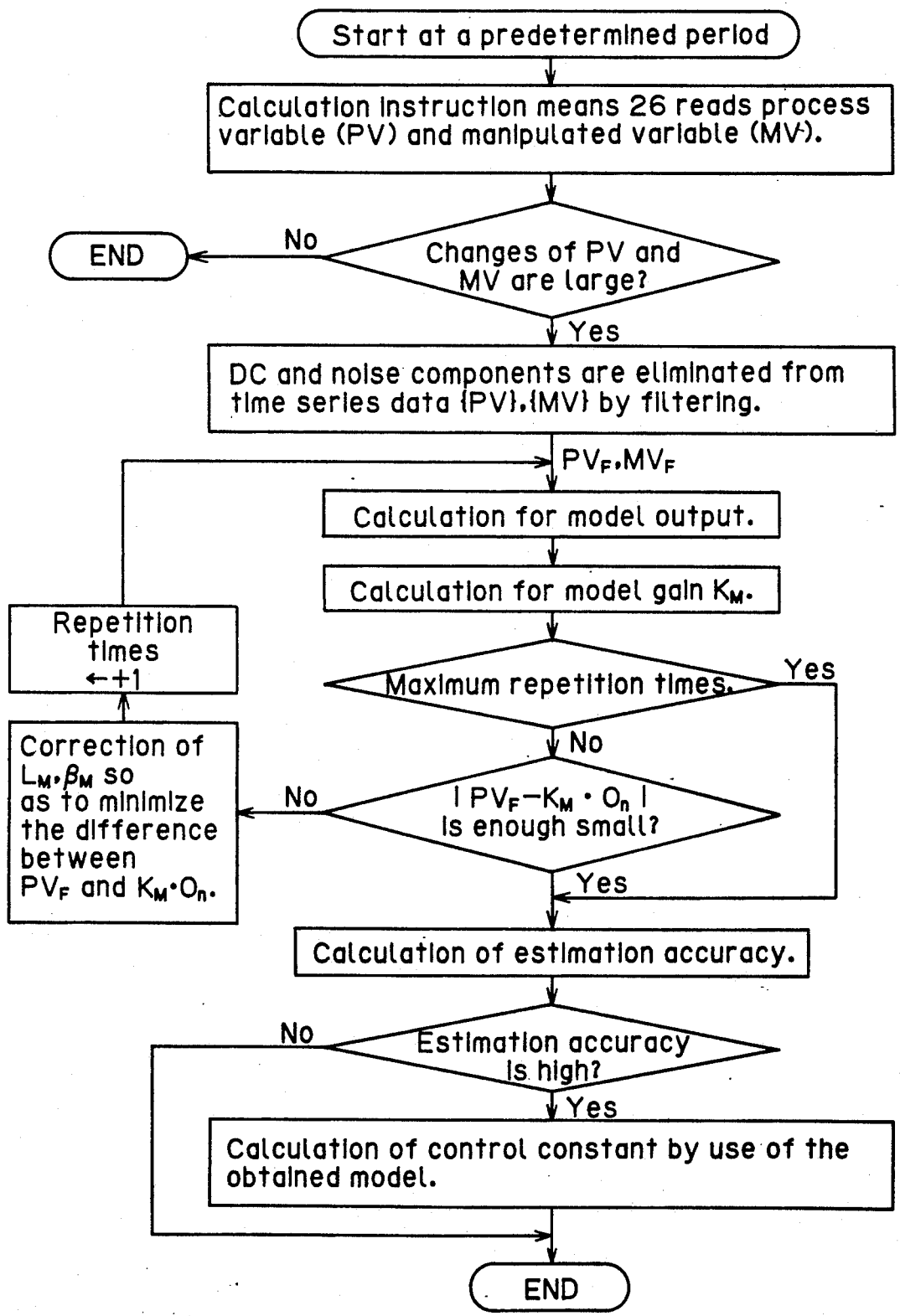

The operation of FIG. 10 will now be explained with reference to the flow chart of FIG. 11. The calculation instruction means 26, shown in FIG. 6, periodically reads manipulated variable MV and process variable PV, and only when those fluctuations become large (i.e. YES), that is larger than a predetermined value, the following steps are executed. If the fluctuations are less than the predetermined value, (i.e. NO), the operation is ended.

At preprocessing means 311, time series data {PV} and {MV} concerning the process variable and manipulated variable, respectively, are filtered so as to eliminate the DC component and the noise component, and then the output of the process model is calculated by process model 312.

In this calculation, process gain $K_M$ is made to be 1, and the calculation is carried out by the following equation (5).

$$O_n = O_{n-1} + (1-\beta_M) \cdot MV_F(n-L_m) \qquad (5)$$

wherein the respective coefficients have the same meaning as in equation (2).

Next, at gain operation means 313, process gain $K_M$ is calculated by use of the following equation (6).

$$K_M = [\Sigma\{O(n) \cdot PV_F(n)\}] / \{\Sigma O(n)^2\} \qquad (6)$$

wherein O(n) is the value obtained by the above equation (5), that is, the output from process model 312 when process gain $K_M$ is made to be 1.

These calculations are carried out repeatedly until the repetion number reaches a maximum number (i.e. YES) or when the number is less than maximum (i.e. NO) until the product of output $O_n$ of process gain $K_M$ calculated by gain operation means 313 becomes sufficiently close to time series data $PV_F$ of the process variable (i.e. YES).

When all of the above conditions are not satisfied (i.e. NO) dead time $L_M$ of process model 312 and first order lag coefficient $\beta_M$ are adjusted so as to minimize the above difference. Then, process model 312 is restarted, and such operations are carried out, so that the output is calculated in accordance with equation (5) and so that process gain $K_M$ is calculated in accordance with equation (6).

When all of the conditions are satisfied (i.e. YES), accuracy K of process model 312 is calculated. When this estimation accuracy is better than a predetermined value, (i.e. YES), control operation parameter operating means 25 calculates proportion/integration/differentiation constant (PID), that is, control operation parameters using Ziegler-Nichols method, based on obtained process model 312 of the first order lag process model. If the accuracy is not sufficiently high (i.e. NO), the operation is ended.

Control operation means 20 calculates the manipulated variable MV by using the newly obtained control parameter. Internal parameter adjusting means 315 calculates dead time $L_M$ and first order lag coefficient $\beta_M$ by the repetition search method which uses a simplex method. The FIG. 10 embodiment thus advantageously reduces the calculation time as a whole.

Furthermore, if process gain $K_M$ becomes necessary at the beginning of the repetition, the last time process gain $K_M$ is used again. In this embodiment, process gain $K_M$ is automatically determined when dead time $L_M$ and first order lag coefficient $\beta_M$ are determined. Thus, the numbers of repetition search can be reduced.

For example, the simplex method can be used when internal parameter adjusting means 315 searches the internal parameter of process model 312. By the simplex method, some points having geometrical arrangement on $R^n$ are selected, and the search is carried out by comparing the values of the object function at these points. This method is disclosed in "Non-linear Programming" by Hiroshi Imano and Hiroshi Yamashita, published by Nippon Kagaku Gijutsu Rengou, pp 284–287.

However, the input/output I/O data of the usual simplex method are discrete values, in principle. Since the object function enters into the space of the discrete values, a search may become impossible. Furthermore, the parameters, such as time constants and dead time, must be positive numbers.

Figure 12:
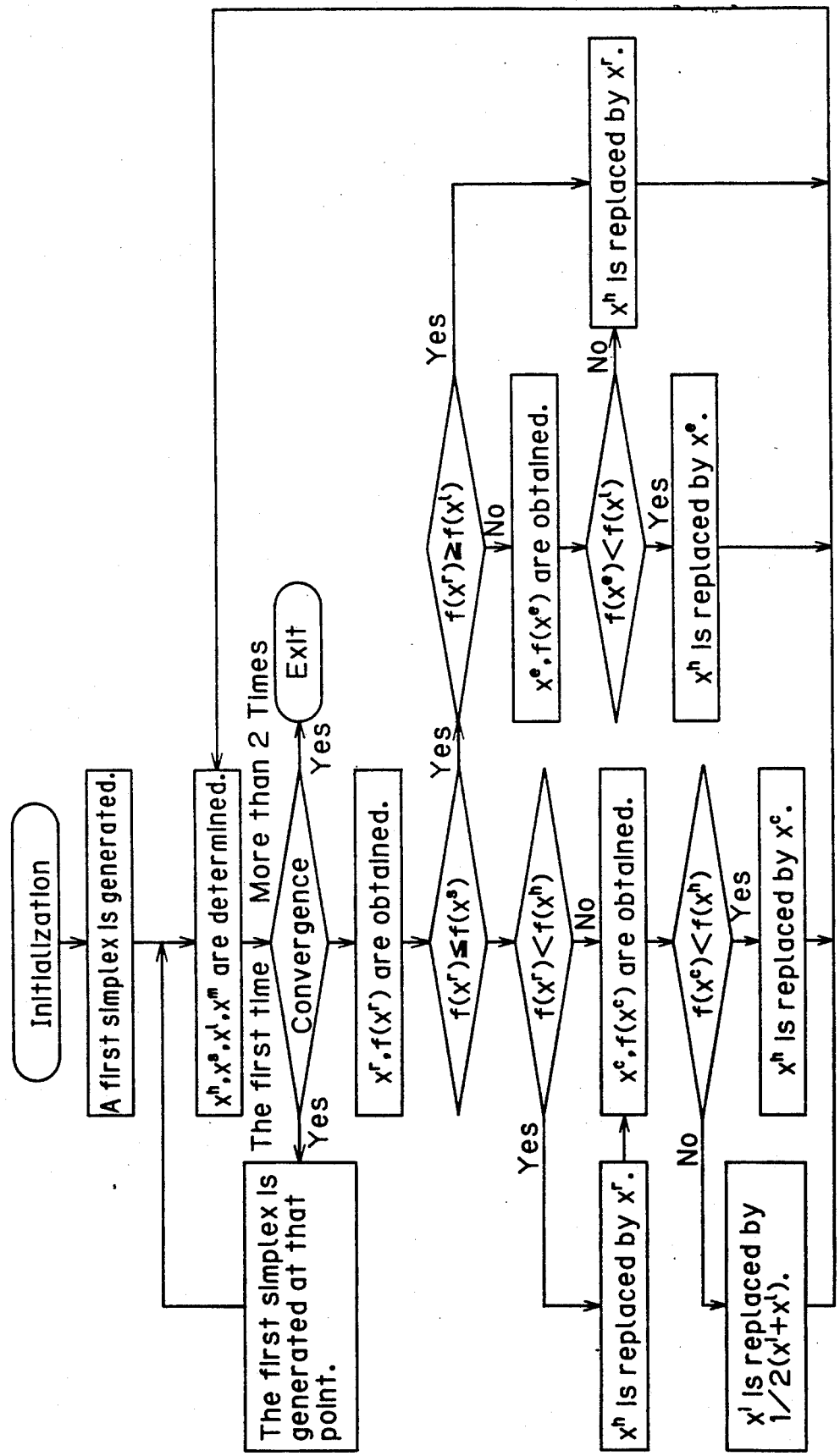
FIG. 12 is a flow chart of a search method using a simplex method.

FIG. 12 shows the procedure of the simplex method, wherein the above mentioned restrictions are eliminated. In FIG. 12, assume that the process data gathered by data gathering means 22 correspond to geometrical points x on $R^n$, and that the object function corresponds to function f( ) at this geometrical point. The search is carried out by comparing the values of the object function f( ). Also, assume that among points x, a point where the object function f( ) takes the maximum value, is $x^h$, that among points x, a point where the object function f( ) takes the second magnitude value, is $x^s$, that among points x, a point where the object function f( ) takes the minimum value is $x^l$, and that a centroid of the graphic pattern, which has points x as summits, is $x^m$. Also, the following points are defined as follows.

Reflection plane. $x^r = (1+\alpha) \cdot x^m - \alpha x^h$, wherein $\alpha > 0$
Expansion. $x^e = \gamma \cdot x^r + (1-\gamma) \cdot x^m$, wherein $\gamma > 1$
Contraction. $x^c = \beta \cdot x^h + (1-\beta) \cdot x^m$, wherein $\beta \epsilon (0.1)$ Reduction. All of the summits are reduced to direction of $x^l$.

In FIG. 12, after initialization, (n+1) affine independent convex hulls on $R^n$ are generated by a first simplex. Next, the above $x^h$, $x^s$, $x^l$, and $x^m$ are decided, and judgment is made whether convergence is carried out. The judgment is made in a way to determine whether the following equation can be satisfied.

$$\Sigma(f(x^i) - f^m)^2/(n+l) \leq \epsilon, \text{ wherein } f^m = \Sigma f(x^i)/(n+l)$$

When the convergence condition is satisfied, and if the convergence is the first time (i.e. YES left), simplex is generated at this point, and the operation is repeated from the step where $x^h$, $x^s$, $x^l$, and $x^m$ are decided. The operation ends when the convergence is accomplished more than two times (i.e. YES right).

When there is no convergence, $x^r$ and $f(x^r)$ are calculated, and judgment is made whether the following equation is satisfied.

$$f(x^r) \leq f(x^s)$$

When this condition is not satisfied, judgment is made whether the following equation is satisfied.

$$f(x^r) < f(x^h)$$

When the above equation is satisfied (i.e. YES) $x^h$ is replaced with $x^r$. When the above equation is not satisfied (i.e.NO), $x^c$ and $f(x^c)$ are obtained by leaving the equation as it is, and judgment is made whether the following equation is satisfied.

$$f(x^c) < f(x^h)$$

When the above equation is satisfied (i.e. YES), $x^h$ is replaced with $x^c$. When the above equation is not satisfied, (i.e. NO), $x^l$ is replaced with $(x^i + x^l)/2$, and the operation returns to the step where $x^h$, $x^s$, $x^l$, and $x^m$ were decided.

On the other hand, when the equation $f(x^r) \leq f(x^s)$ is satisfied (i.e. YES) judgment is made whether the following equation is satisfied.

$$f(x^r) = f(x^l)$$

When the above equation is not satisfied (i.e. NO), $x^e$ and $f(x^e)$ are obtained, and judgment is made whether the following equation is satisfied.

$$f(x^e) < f(x^l)$$

When the above equation is satisfied (i.e. YES), $x^h$ is replaced with $x^e$, and the operation is returned to the step where $x^h$, $x^s$, $x^l$ and $x^m$ were decided.

When the above equation is not satisfied (i.e. NO) and when $f(x^r) \geq f(x^l)$ is satisfied (i.e. YES), $x^h$ is replaced with $x^r$, and the operation returns to the step where $x^h$, $x^s$, $x^l$ and $x^m$ were decided.

In contrast to the usual simplex method, in this embodiment, when the convergence is for the first time., simplex is generated at this point, and the simplex method is carried out once again. Thus, entering of the object function into the subspace can be avoided, and negative numbers can be used for such parameters.

In FIG. 12, although the length of each component side which comprises an initial polygon is made longer than the sampling period and although the initial polygon is remade at least once, it is also possible to satisfy either of these two conditions.

In the FIG. 6 embodiment, initial values for the proportional constant (P), integral constant (I), and differential constant (D), and sampling period must be set before the control operation. If these values are not properly set, automatic adjustment of the control operation can not be carried out properly. As a result, the control characteristics may deteriorate. The embodiment of FIG. 13 eliminates these possible situations by previously tuning both the control operation parameters and the sampling period. In the FIG. 13 embodiment, the same reference numerals are used for the same components as in FIG. 6, and hence discussion thereof is omitted hereat.

Figure 13:
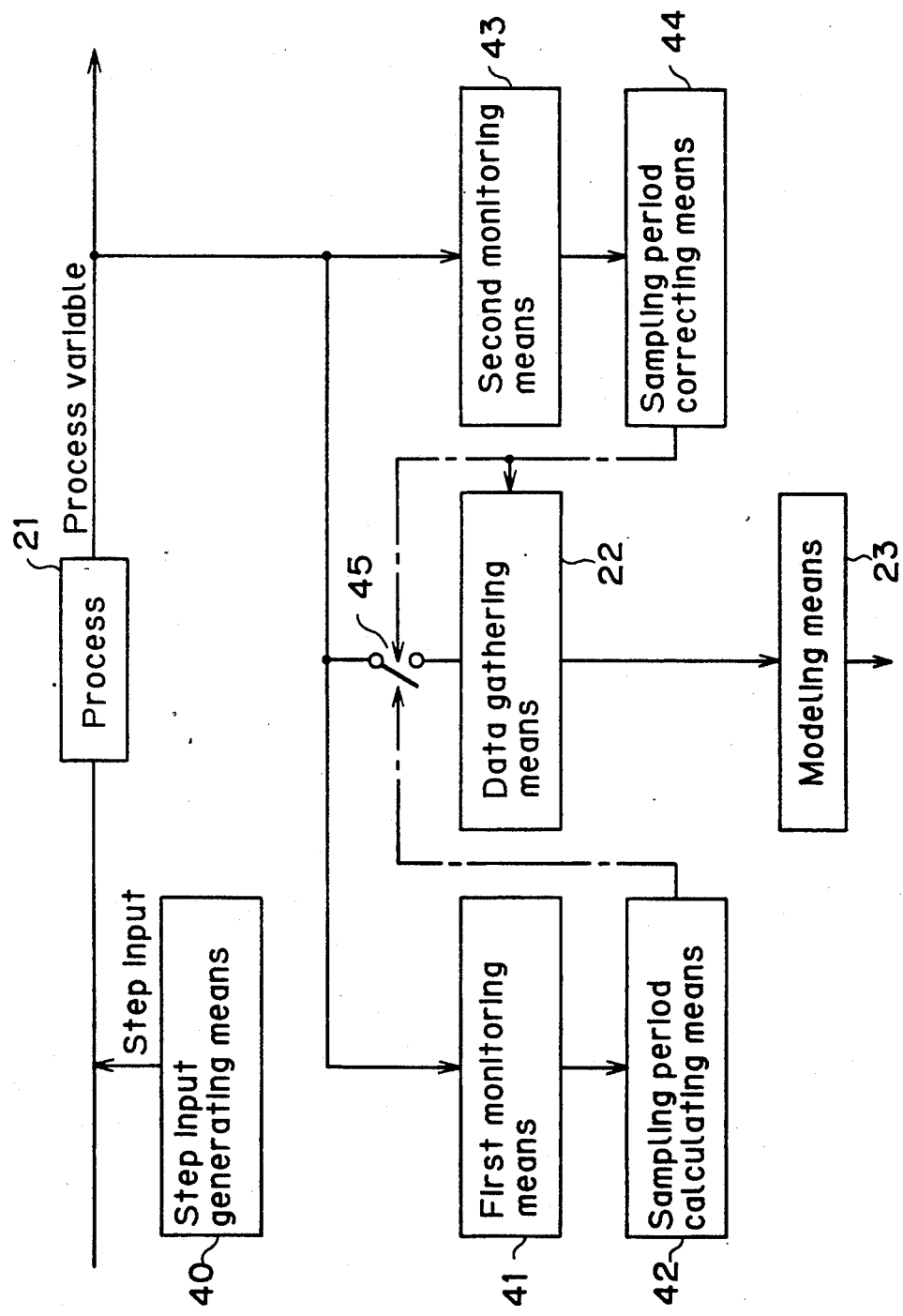
FIG. 13 is a block diagram depicting the main part of a further illustrative embodiment of the invention.
Figure 14:
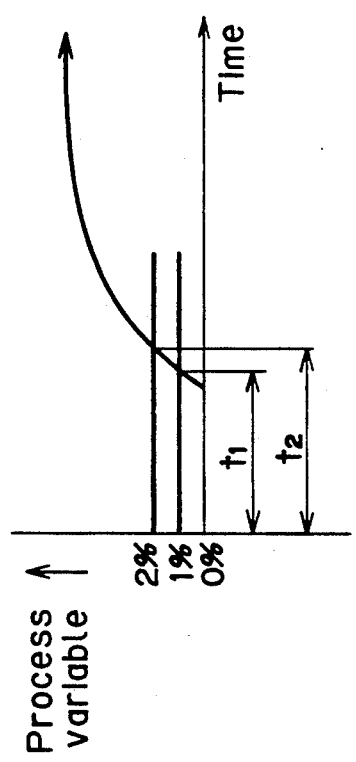
FIG. 14 is a waveform diagram depicting the change of process variable when a step like manipulated variable is applied to the process.

In FIG. 13, a step input generating means 40 applies a step like manipulated variable to process 21. By this input of the manipulated variable, the process increases gradually as shown in FIG. 14. A first monitoring means 41 monitors the process variable of process 21 so that after application of the step like manipulated variable from step input generating means 40, time width $t_1$ (called first time width) until the process variable reaches a first predetermined value, for example, 1% of the full scale, is measured by the first monitoring means 41.

A sampling period calculating means 42 receives the first time width $t_1$ measured by first monitoring means 41 and based thereon, the sampling period of data gathering means 22 is calculated, and the sampling period signal is applied to control switch 45. A second monitoring means 43 monitors the process variable from process 21 so that after application of the step like manipulated variable from step input generating means 40, time width $t_2$ (called second time width) until the process variable reaches a second predetermined value larger than the first predetermined value, for example, 2% of the full scale, is measured by second monitoring means 43.

A sampling period correcting means 42 receives the second time width $t_2$ measured by second monitoring means 43 and the sampling period calculated by sampling period calculating means 42, is corrected.

Switch 45 comprises a sampler, and is turned ON for every period calculated by sampling period calculating means 42. Later, switch 45 is turned ON for every period corrected by sampling period correcting means 44. In accordance with these sampling periods, process variable data is introduced from process 21 into data gathering means 22. The gathered data is inputted to modeling means 23, and its internal parameters are adjusted, as explained in the FIG. 6 embodiment, until the output from process model 232 coincides with the process variable. Based on the internal parameters, control constants are calculated.

Figure 15:
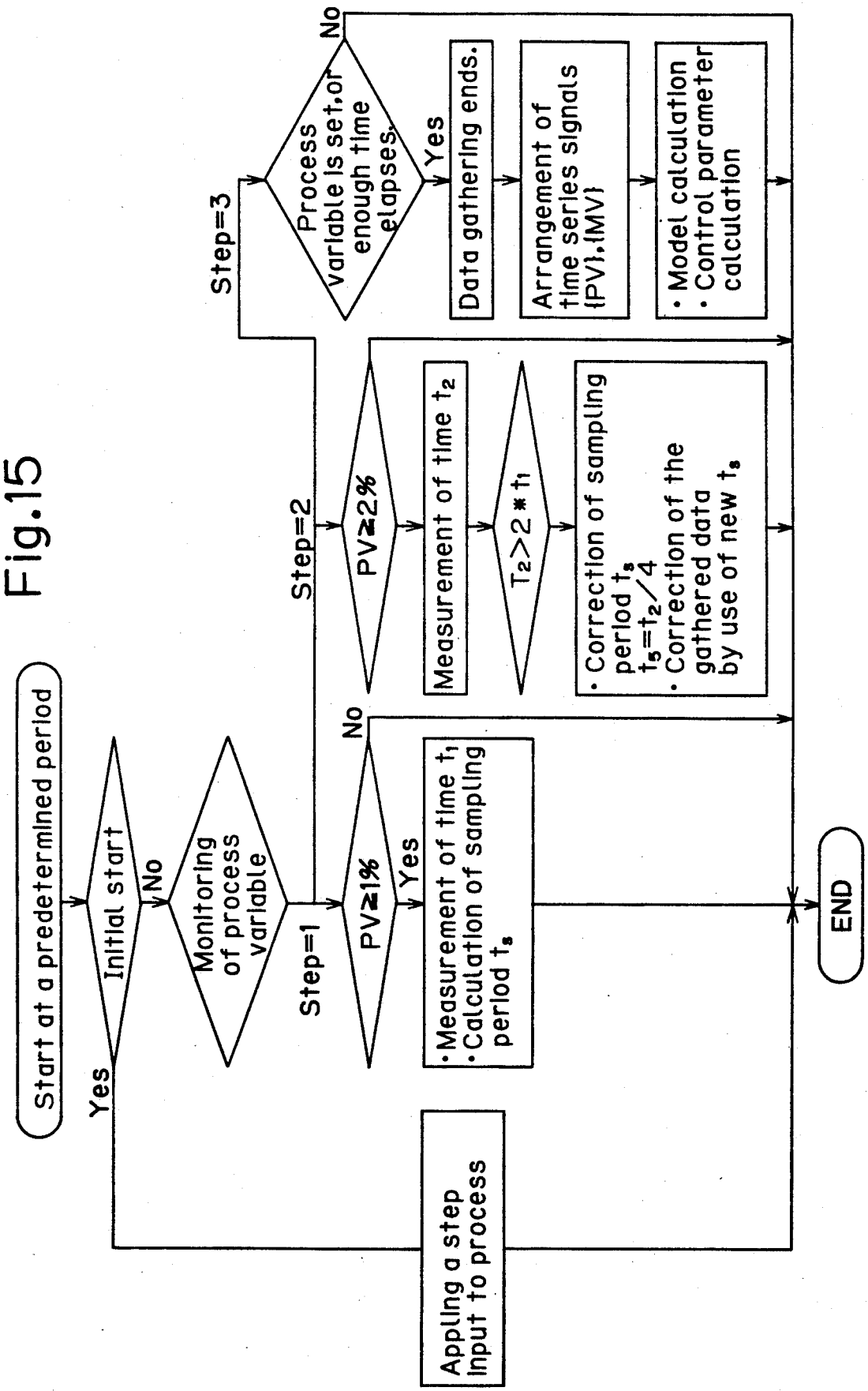
FIG. 15 is a flow chart depicting the operation of the embodiment of FIG. 13.

The operation of the FIG. 13 embodiment will now be described with reference to the flow chart of FIG. 15, wherein the operation is executed at a predetermined period at the initial stage of control. First, the condition of "start" is judged to determine whether it is an initial state or not. If it is an initial start (i.e. YES), a step like manipulated variable is applied to process 21, and the operation is ended.

On the other hand, if the start is not an initial start (i.e. NO) judgment is made to determine whether the process corresponds to either of the following steps. If the process does not correspond to any of these steps (i.e. NO in each case), the operation ends without doing anything.

Step 1. When the process variable exceeds 1% of full scale.

Step.2. When the process variable exceeds 2% of full scale.

Step. 3. When the process variable PV is settled at a fixed value, or becomes a value which is an integer times the sampling period obtained by sampling period correcting means 44.

When the process variable corresponds to step 1 (i.e. YES), elapsed time $t_1$ is measured, $t_1$ being the time elapsed after application of the step like manipulated variable to the process, namely, the first time width; and $t_1 (1/n)$ is used as sampling time $t_s$, wherein in n is an integer. For example, sampling time $t_s$ is as follows.

$$t_s = t_1/4.$$

Then, the operation is ended.

When the process variable corresponds to step 2 (i.e. YES), elapsed time $t_2$ after application of the step like manipulated variable to the process, i.e. second time width, is measured. Then the second time width $t_2$ is judged to determine whether it is larger than twice the time width $t_1$ obtained in step 1. If the time width $t_2$ is larger than twice $t_1$, sampling time is made to be as follows.

$$t_s = t_2/4.$$

In this case, interpolation is applied to previously gathered data so as to use the data as data for new sampling period $t_s$. The operation is then ended.

When the process variable corresponds to the step 3 (i.e. YES) data gathering operation of the process variable is terminated, and arrangement of time series data {pv} and {MV} with respect to the process variable and the manipulated variable, stored in data gathering means 22, is carried out. Based on these time series data, the internal parameters of the process model are adjusted by modeling means 23, and control constants are obtained.

The obtained control constants are used as an initial value. Then, data gathering is carried out by sampling period $t_s$, and the control parameters are calculated in accordance with the procedure of FIG. 7.

The step like manipulated variable is applied once at the beginning of the control. In the case of the non-integral type of process, process variable PV can settle by a one time application of the step like manipulated variable MV, as shown in FIG. 16(a).

Figure 16:
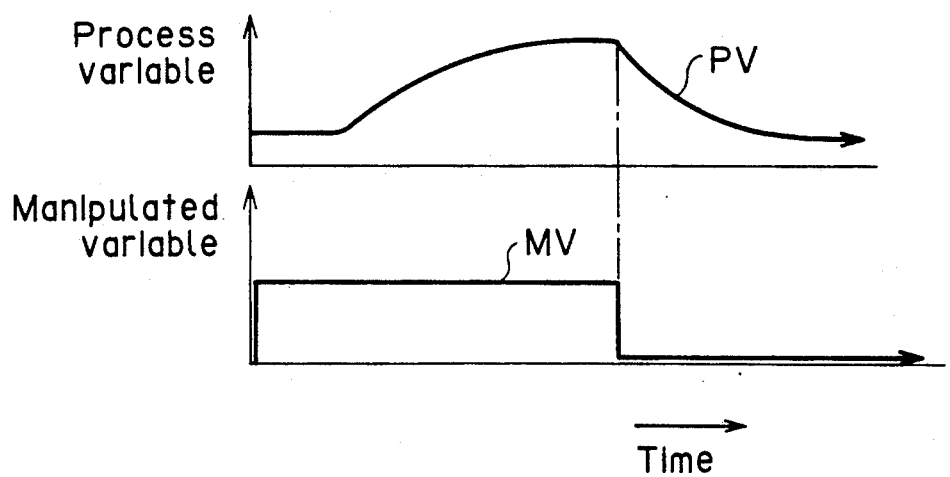
FIG. 16(a) and FIG. 16(b) are wave form diagrams depicting the change of process variable in another example when the step like manipulated variable is applied to the process.
Figure 16:
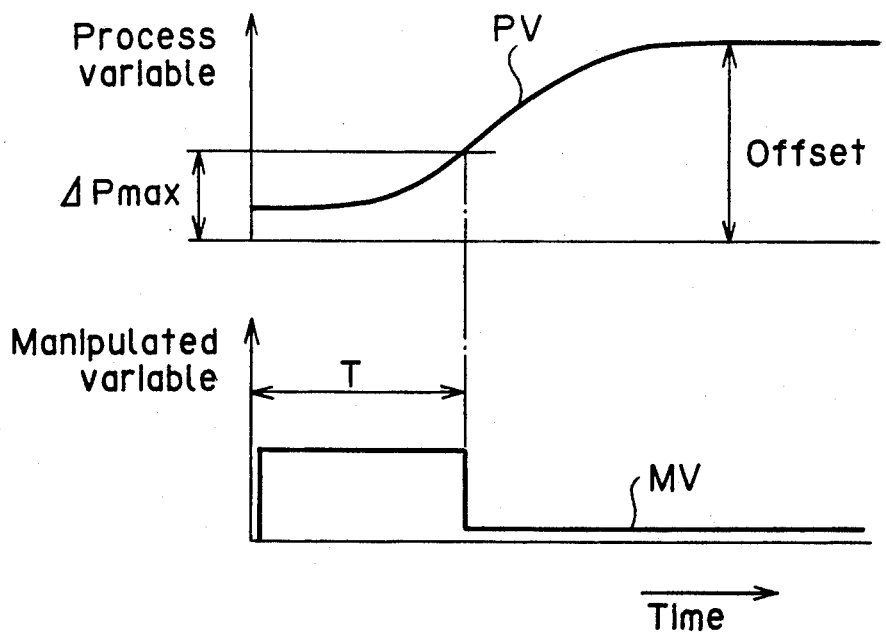

However, in the case of the integral type of process, offset remains as shown in FIG. 16(b). Accordingly, in this case, after the process variable is settled, a step like signal is applied in an opposite direction so as to eliminate the above offset, and then, sampling of the process data continues. If change of the process variable exceeds a fixed tolerance, the step like signal is applied in an opposite direction even though the process variable has not settled, so that the process variable will not become too large. Furthermore, it is possible to judge whether the process is of an integral or non-integral type from the amount of offset.

Time period T, during which the step like manipulated variable is applied, is set to a fixed time or a time until the process variable PV reaches $\Delta_P$max. (See FIG. 16(b))

The foregoing illustrative embodiments of the invention have many advantages. For example, although the control constants are derived from the internal parameters of the modeling means by use of the Ziegler-Nichols method, the least square method, or the maximum likelihood degree method, etc.

In the above embodiments, process data is gathered by the data gathering means and the modeling means is started so as to correct the internal parameters of the process model only when change occurs in the process data. Then, estimation accuracy of the process model is calculated, and the control constants are calculated. Thus, in the embodiment, identification signals are not necessary. Accordingly, these embodiments have a distinct advantage in that extra disturbances are not applied to the process.

Also, since calculation of the estimation accuracy of the process model is carried out, if the model is judged to be inadequate, the adjustment of the control constant is stopped or reduced. Thus, an uncontrollable state in the process control device, such as shutdown, overshooting, etc, is readily avoided.

Moreover, advantageously, since calculation of the process model is carried out while the data gathering means is gathering the process data, the extra time required in prior art devices to gather data, is not required in the invention devices.

Furthermore, since the process gain is calculated from the process variable and the output of the process model, advantageously, in the invention, the search time is considerably shortened.

Also, the invention avoids the disadvantage resulting from the object function entering into the subspace, since a simplex method is used as the searching method, and since simplex is regenerated at the first convergence.

Furthermore, advantageously, since at the beginning of control, a step like manipulated variable is applied to the process, and since the initial values of the sampling period and the control constants are derived from the change of the process variable at that time, optimum control is obtained.

Figure 17:
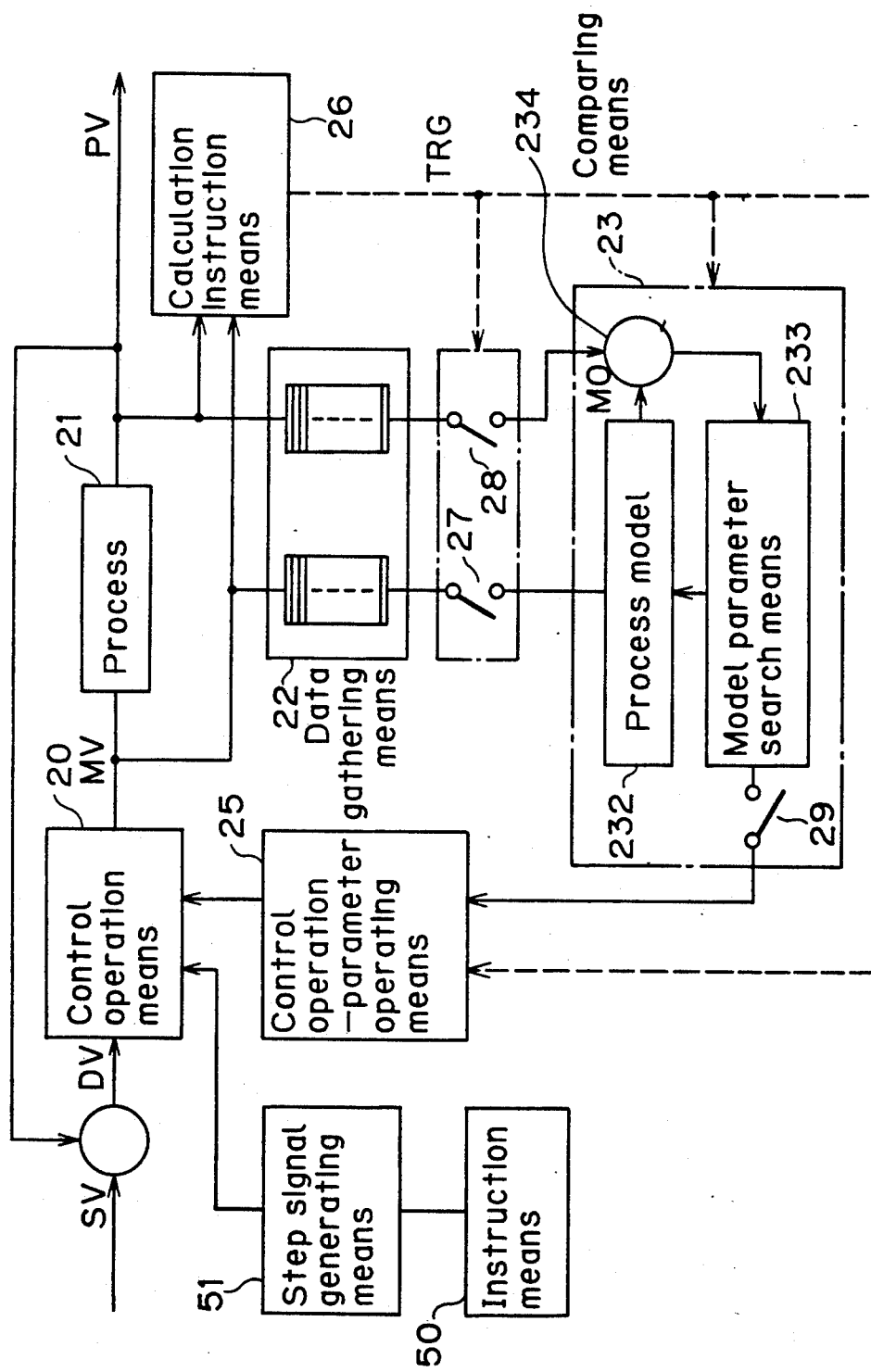
FIG. 17 is a structural block diagram depicting a further illustrative embodiment.

Turning now to other embodiments of the invention, FIG. 17 omits the estimation accuracy operating means 24 of FIG. 6. In its place, manual instruction means 50 and step signal generating means 51 are provided, wherein step signal generating means 51 generates a step like pulse signal to be applied to process 21, based oh the instructions received from instruction means 50.

Figure 18:
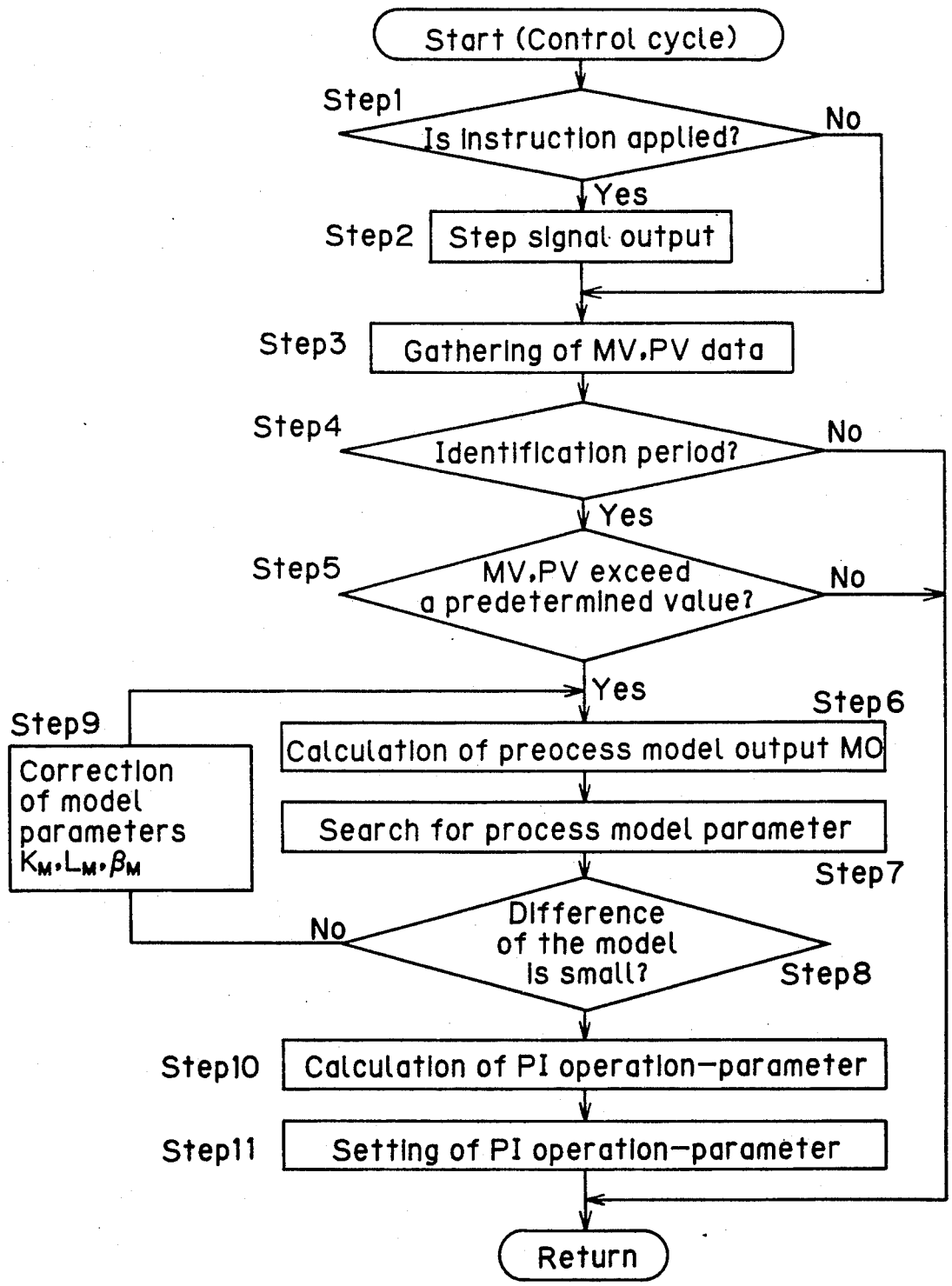
FIG. 18 is a flow chart depicting operation of the embodiment of FIG. 17.

FIG. 18 is a flow chart for tuning operation to calculate the control operation parameters, which is started at a predetermined period in the embodiment of FIG. 17.

First, judgment is made as to whether instruction for generating a step signal (i.e. instruction from instruction means 50) exists. (Step 1) When the instruction exists (i.e. YES), a step signal having a fixed width is generated by step signal generating means 51 and is applied to manipulated variable MV in control operation means 20 (Step 2). When the instruction does not exist (i.e. NO), Step 2 is skipped.

Figure 19:
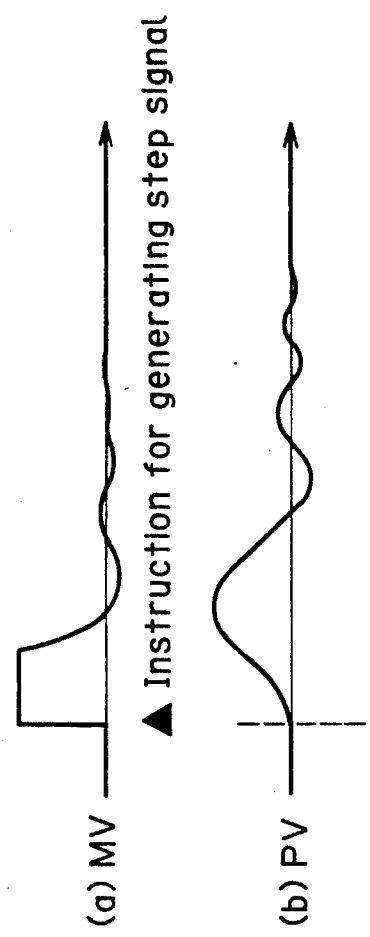
FIG. 19 comprising lines(a) and (b), is a waveform diagram depicting the change of process variable when a step like signal is applied to the manipulated variable.

FIG. 19 shows manipulated variable MV and process variable PV, wherein change of the process variable PV is shown when the step like signal signal is applied as a manipulated variable MV.

When the manipulated variable changing step like signal, shown in line (a) of FIG. 19, is applied to process variable PV, process variable PV responds in such a manner as shown in line (b), in accordance with its dynamic characteristics.

Returning to FIG. 18, data gathering means 22 receives manipulated variable MV and process variable PV, and holds these data as time series data for a predetermined period (Step 3).

Calculation instruction means 26 reads the manipulated variable MV and the process variable PV, and monitors, at every identification period ,(Step 4), whether the fluctuations of these signals exceeds a predetermined value (Step 5). When the fluctuations of these signals is less than the predetermined value (i.e. NO),it is judged that the control is satisfactory, and the operation terminates without generating a trigger signal. As shown in FIG. 8, the above judgment is made based on the size of the shaded area calculated by integrating the deviation of process variable PV from its steady state and the deviation of manipulated variable MV from its steady state for a fixed time.

At step 5, when the step signal is applied and when both manipulated variable MV and process variable PV become large, that is exceeds the predetermined value (i.e. YES), calculation instruction TRG is generated. When calculation instruction signal TRG is received by modeling means 23, it functions to estimate the dynamic characteristic of process 21 by using the change of manipulated variable MV and the response waveform of process variable PV from process 21, based on the data applied, for a predetermined time, from data gathering means 22 (Steps 6 to 9).

At step 8, when the difference of the model becomes small, that is, when output MO of process model 232 coincides with process variable PV, control operation means 20 calculates, based on the obtained parameters of process model 232, proportion (PB)/ integration (TI)/differentiation (TD) parameters in accordance with the following formula (7), for example, by use of the Ziegler-Nichols method, and the obtained operation parameters are set in control operation means 25 (steps 10 and 11).

$$(PB/K_M) = a(L_M/\beta_M)^2 + b(L_M/\beta_M) + c \quad (7)$$

$$(TI/\beta_M) = d(L_M/\beta_M)^2 + e(L_M/\beta_M) + f$$

$$TD = 0.2 \cdot TI$$

Control operation means 20 calculates manipulated variable MV by using the newly set operation parameters.

Step signal generating means 51 applies a pulse signal in place of the step signal when the process is an integral type of process.

In the embodiment, PI operation parameter can be set to an optimum value arbitrarily, if necessary, by applying a step like signal to the manipulated variable in an automatic control state, in accordance with the instruction signal. Thus, operability of the embodiment is improved considerably.

Furthermore, since the calculation to obtain the process model output at modeling means 23 or the calculation to search the parameters is conducted in accordance with the calculation instruction signal applied from the calculation instruction means, the amount of calculation can be reduced as a whole.

Figure 1:
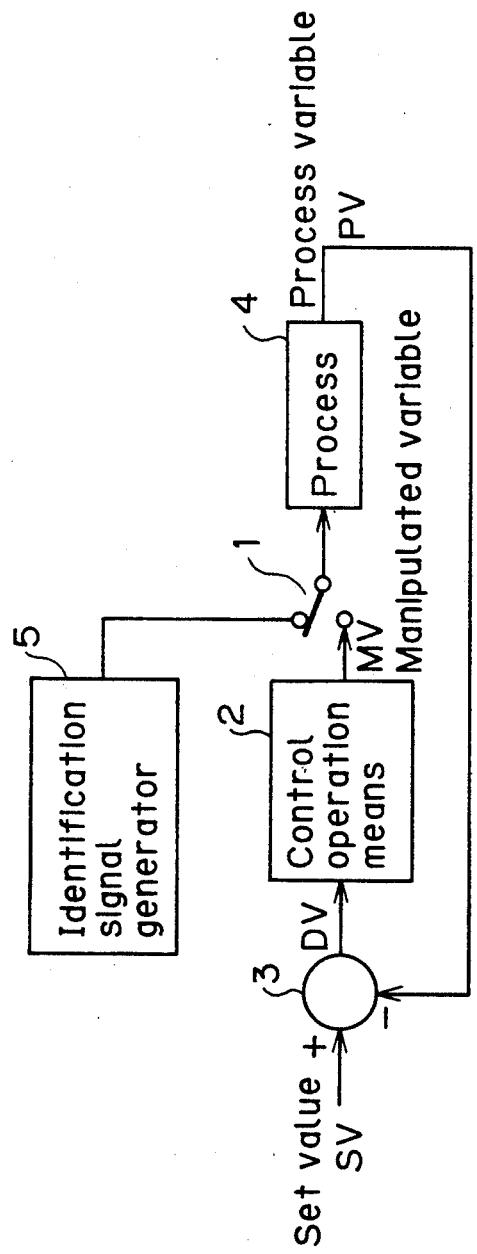
FIGS. 1 to 5 are block diagrams depicting conventional devices.
Figure 2:
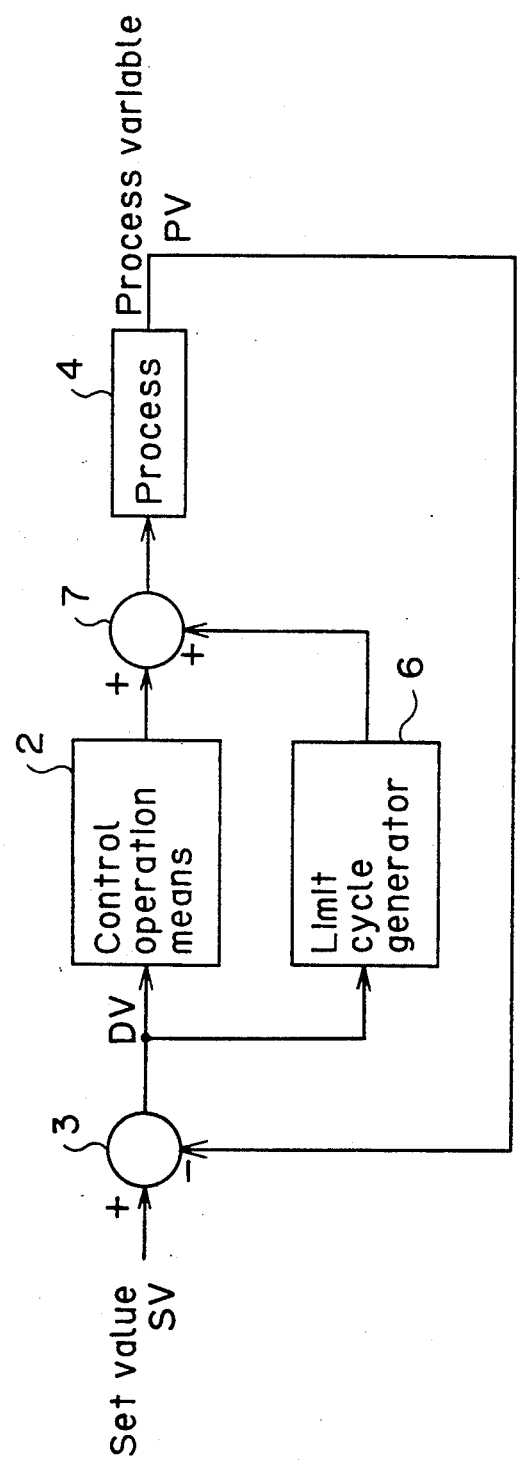
Figure 3:
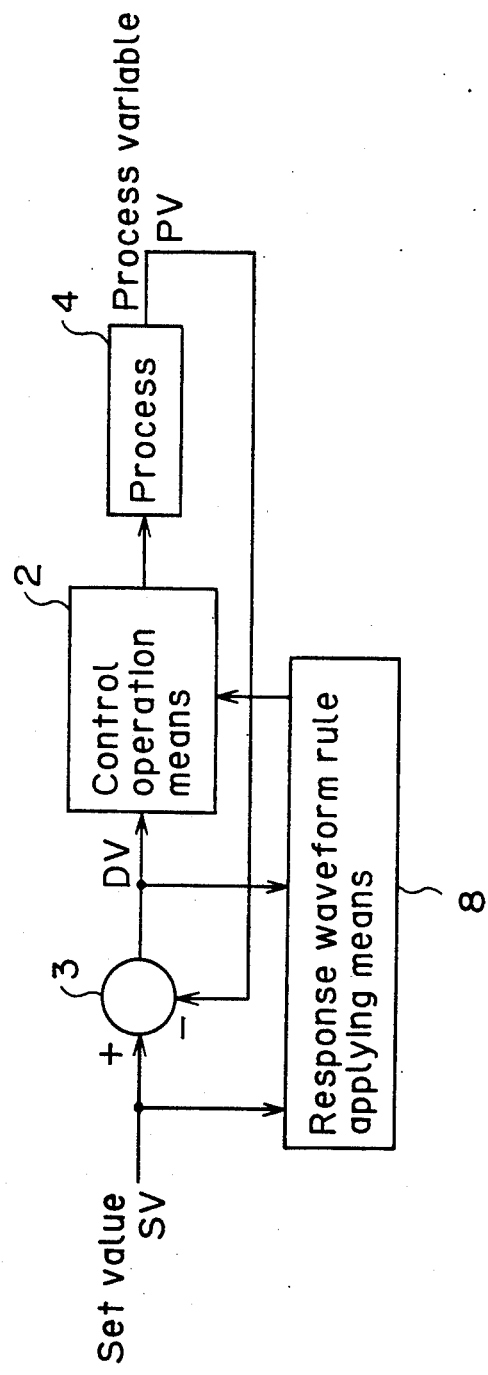
Figure 4:
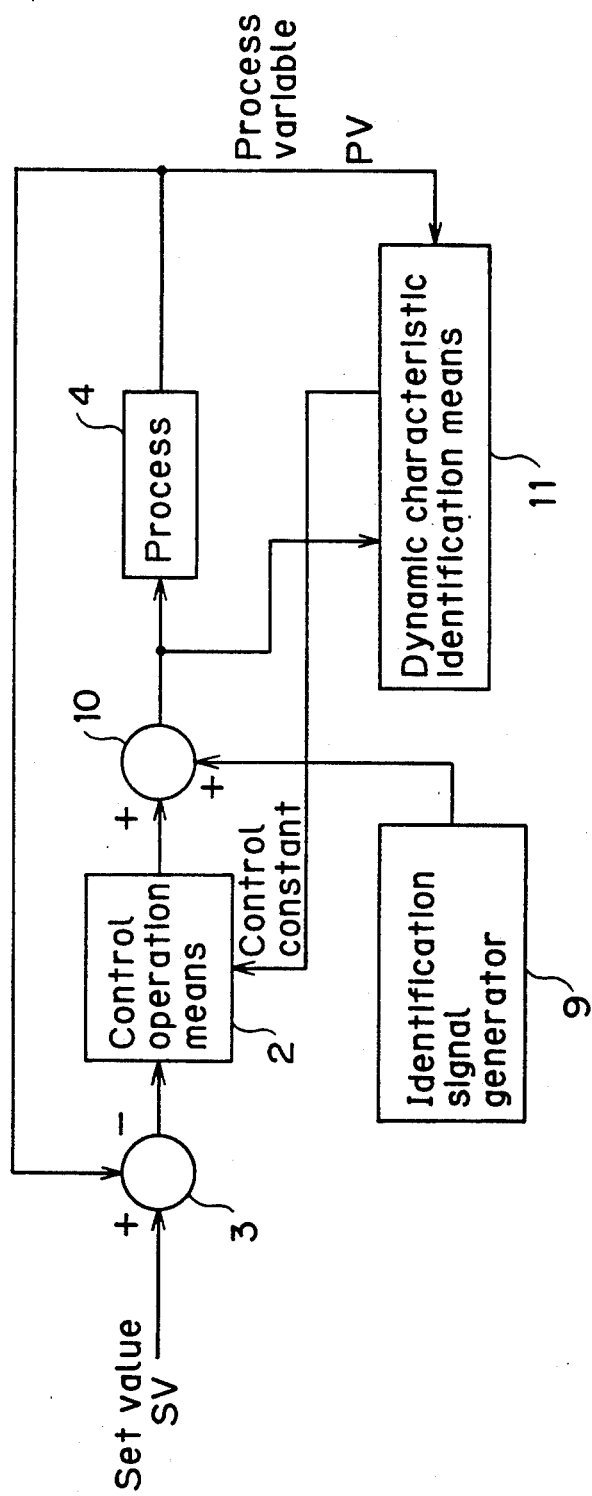
Figure 5:
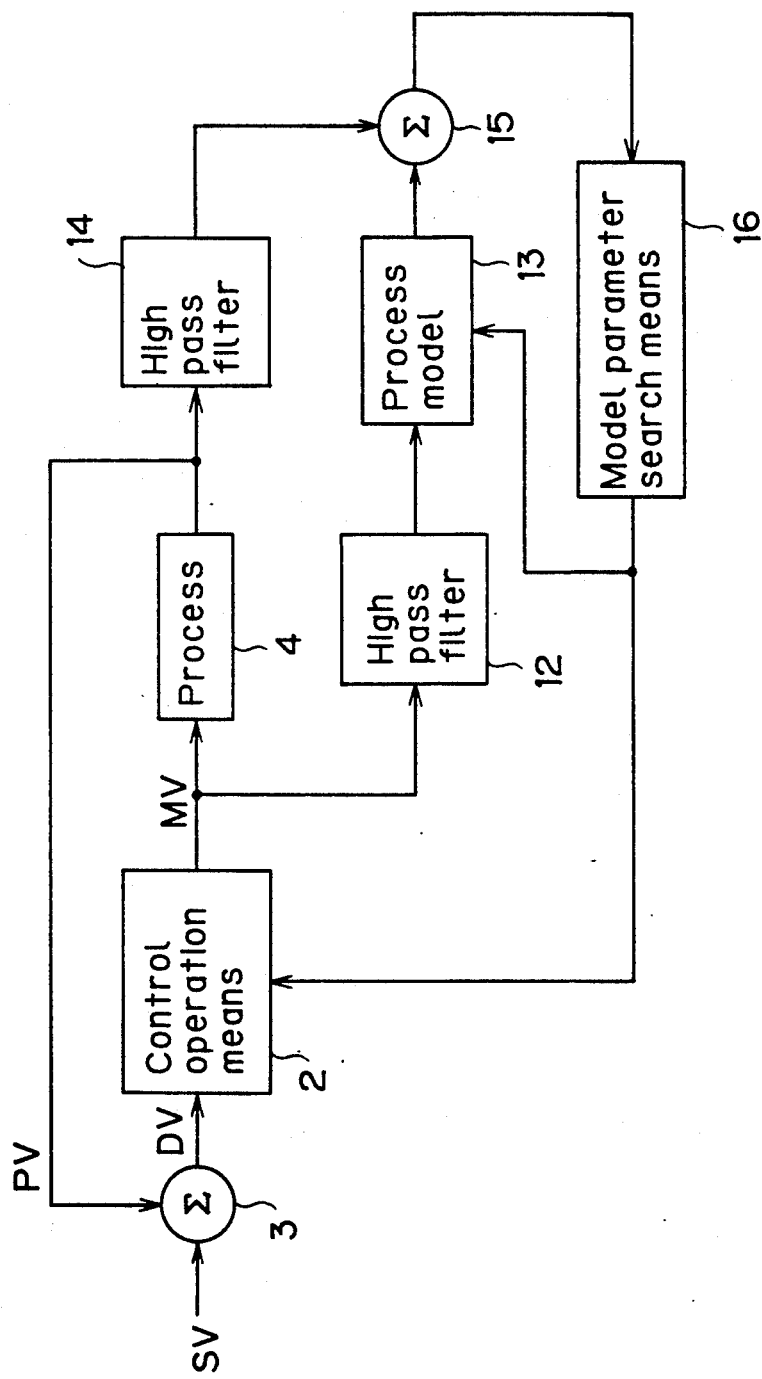
Figure 20:
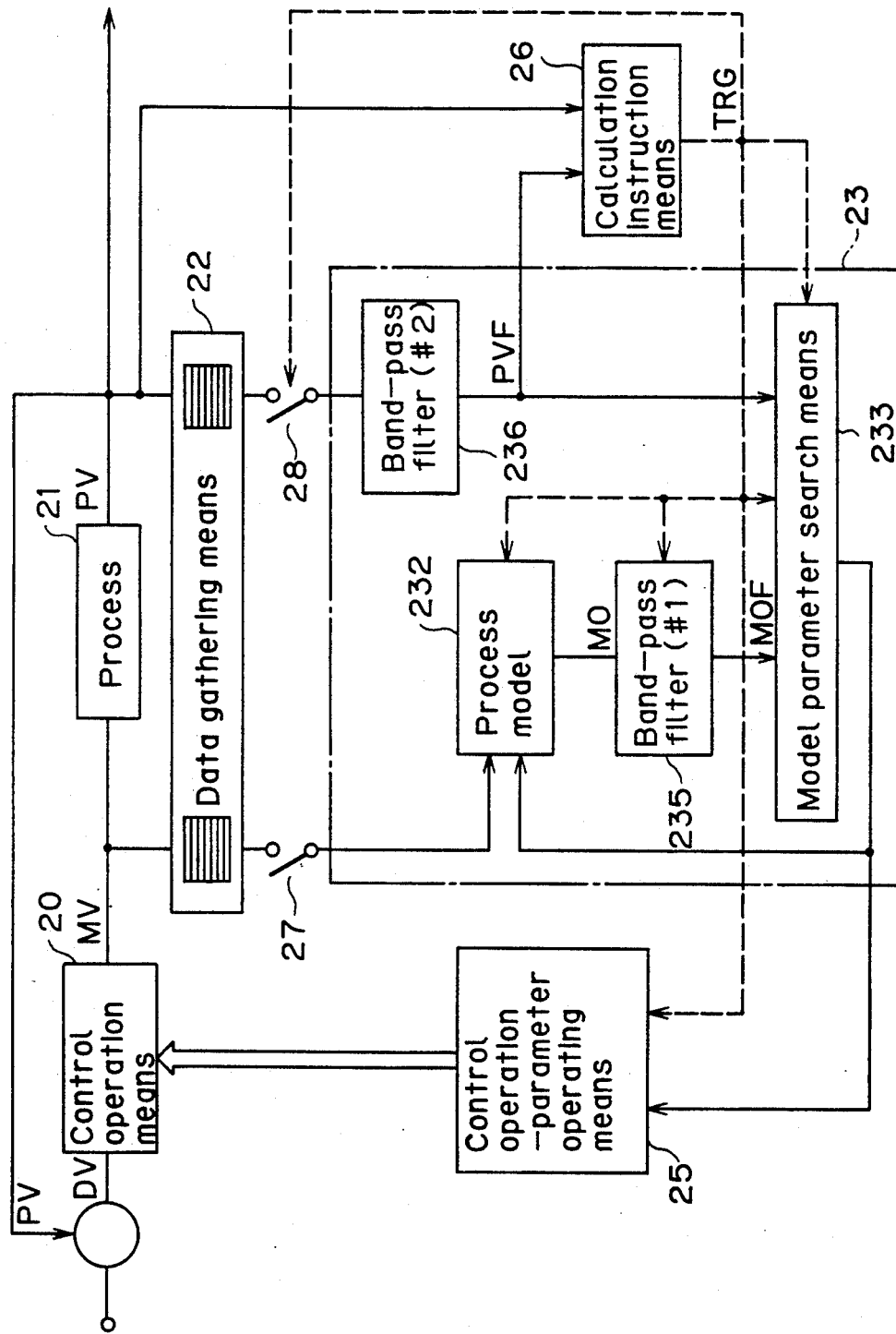
FIG. 20 is a structural block diagram depicting a further illustrative embodiment of the invention.

In FIG. 20, the drawbacks of the prior art device of FIG. 5 are overcome. In the conventional device of FIG. 5, the signal to process model 13 is applied from control operation means 2 through high pass filter 12. Although DC and noise components can be eliminated and calculation in the process model can be simplified, this prior art device has the following deficiencies.

(a) The signal applied to the process model is preferably the same as a signal to be applied to a real process. However, since the signal passes through the high pass filter, the signal level of this signal becomes small or the waveform of the signal is changed. Thus, calculating accuracy in the process model is degraded.

(b) The signal from control operation means 2 flows toward the difference operation means 15 in such a manner that on the process model side the disposition of the high pass filter 12 is different in effect from the real process side.

Thus, it is necessary that process model 13 be of a linear characteristic type so that model parameter search means 16 may search accurately the parameters which reduce the difference signal applied from difference operation means 15. Thus, it is impossible to set the high and low limits in the output and also to use a non-linear characteristic type model for the process model.

The embodiment of FIG. 20 overcomes the aforementioned problems of the prior art, wherein the amount of calculate on in the process model or in the searching of the parameters is reduced. The calculation in the process model can be made accurately corresponding to the real process. Also, a non-linear characteristic type model can be used for the process model.

Signal MV from control operation means 20 is applied to process model 232 through data gathering means 22. Signal MO from process model 232 is applied to a first band pass filter 235 so as to eliminate the DC and noise components. Signal PV from process 21 is applied to a second band pass filter 236, having the same characteristics as that of the first band pass filter 235, through data gathering means 22.

The first and second band pass filters 235, 236 conduct filtering calculations, such as shown in the following equation (8).

$$PV_F = (1-\alpha) \cdot PVF + \alpha \cdot (PV - PVo) \qquad (8)$$

wherein PVF is the applied time series data; PVo is the DC and noise components; $\alpha$ is a filter constant. Calculation instruction means 26 receives signal PV from process 21 and signal. PVF from second band pass filter 236, and when either of these signals changes, calculation instruction signal TRG is generated.

Model parameter search means 233 receives signal MOF from first band pass filter 235 and signal PVF from second band pass filter 236, and based on calculation instruction signal TRG from calculation instruction means 26, searches parameters which make minimum the difference of the signals applied from the first and second band pass filters The parameters of process model 232 are varied based on the searched parameters.

Control operation parameter operating means 25 calculates the operation parameters of control operation means 20 based on calculation instruction signal TRG and the output from model parameter search means 233 and sets the values in control operation means 20.

Calculation instruction signal TRG from calculation instruction means 26 is applied simultaneously to model parameter search means 23, process model 232, first band pass filter 235, switch 28, and control operation parameter operating means 25.

Figure 21:
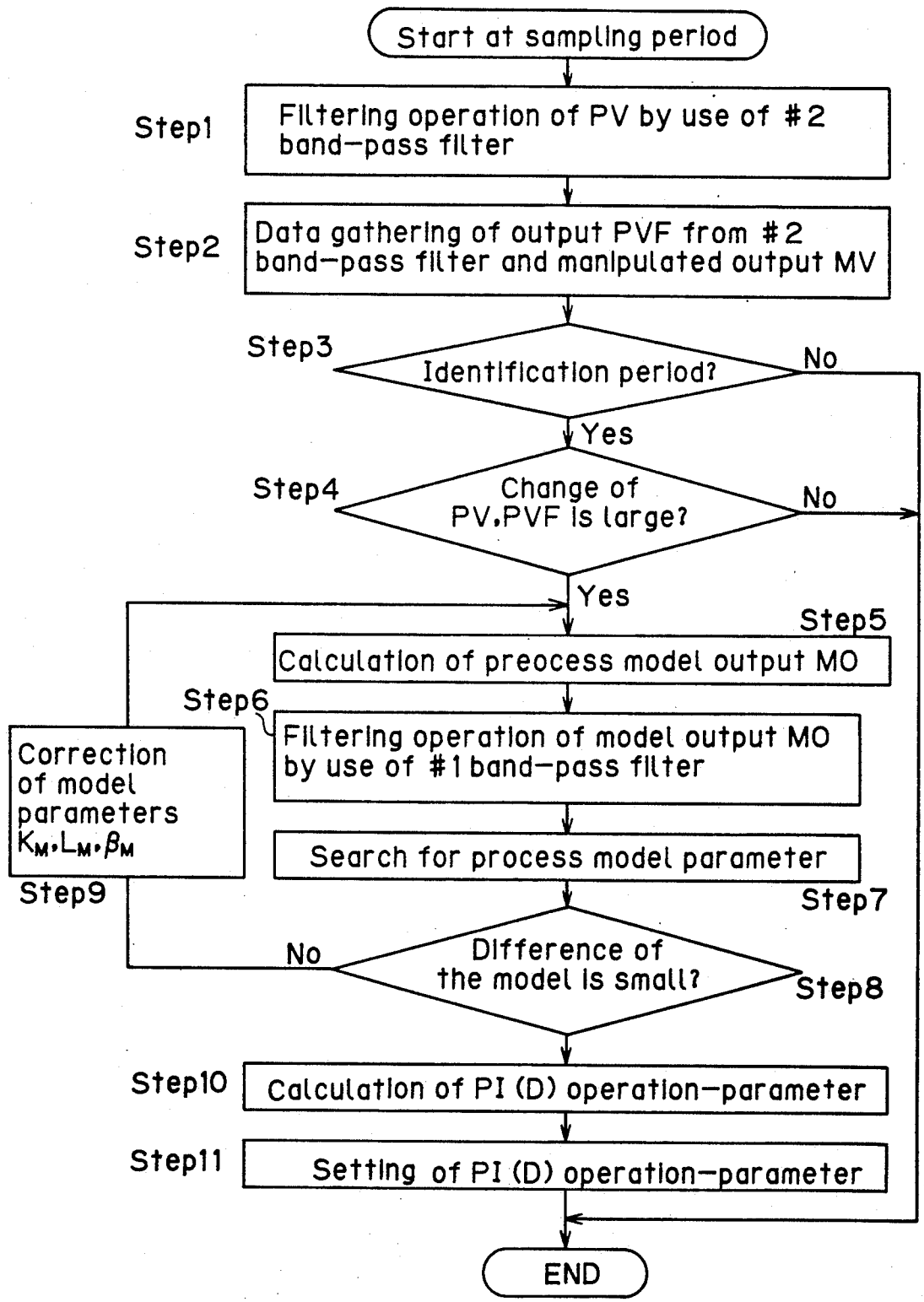
FIG. 21 is a flow chart depicting the tuning action of the embodiment of FIG. 20.

The operation of FIG. 20 will now be described with reference to FIG. 21, wherein tuning action for control operation parameter is started at a predetermined period. Second band pass filter 236 receives process variable PV from process 21, and conducts filtering calculation shown by equation (8) ( Step 1).

Calculation instruction means 26 reads the time series data concerning process variable PV and output time series dat PVF of second band pass filter 236 (Step 2), and, at every identification period (Step 3), monitors whether the change of the data is larger than a predetermined valued (Step 4).

When the change of data is less than the fixed value (i.e. NO), it is judged that the control is in good condition, and the operation ends without generating the calculation instruction signal.

When the change of PV or PVF exceeds the fixed value (i.e. YES), calculation instruction means 26 generates calculation instruction signal TRG. Process model 232 which receives this calculation instruction signal TRG, reads the time series data of manipulated variable MV gathered at Step 2 ( i.e. the same signal as the manipulated variable applied to process 21), and calculates model output MO in accordance with equation (5) (Step 5).

Output MO of process model 232 is applied to first band pass filter 235 in which filtering calculation is carried out in accordance with equation (8) (Step 6). By the filtering operation, the DC and noise components included in model output MO, are eliminated.

Model parameter search means 233 receives time series data MOF from first band pass filter 235 and time series data PVF from second band pass filter 236, and conducts calculation for searching the optimum parameters for process model 232 (Step 7). By this calculation, for example, gain $K_M$ and evaluation function CRIT in the following equation (9) are obtained.

$$K_M = \Sigma\{MOF(n) \cdot PVF(n)\}/\Sigma\{MOF(n)\} \qquad (9)$$

$$CRIT = 1 - \Sigma \{MOF(n) \cdot PVF(n)\}^2/\{MOF(n)^2 \cdot \Sigma PVF(n)^2\}$$

Furthermore, parameter search means 23 functions to search the best combination of time constant $T_M$ and dead time $L_M$ of the model, by which evaluation function CRIT is made minimum. That is, gain $K_M$ of process model 232, dead time $L_M$, and first order lag coefficient $\beta_M$ are corrected, respectively, until the output from process model 232 becomes sufficiently close to the output from process 21 (i.e. the difference of the process model becomes less than a fixed value) (i.e. NO in Step 8), by repeating the operation from step 5 to step 9.

At Step 8, if it is judged that the difference of the model is small, that is, if it is judged that output MOF from first band pass filter 235 is nearly equal to output PVF from second band pass filter 236, control operation parameter operating means 25 calculates, based on the obtained parameters of process model 232, proportion (PB)/integration (TI)/ differentiation 9td) parameters in accordance with equation (7), for example, by use of the Ziegler-Nichols method, and the obtained operation parameters are set in control operation means 20 (Steps 10 and 11).

Control operation means 20 calculates manipulated variable MV by using the newly set operation parameters.

Process model 232 is not necessarily a first order lag type system. Furthermore, when measurable disturbance such as load fluctuation exists in process 21, this disturbance can be used for the model calculation.

In order to obtain the process model, calculation is conducted in such a manner that as to the internal parameters, i.e. gain $K_M$, dead time $L_M$, and first order lag coefficient $\beta_M$, the calculation is conducted repeatedly by changing slightly the value of each internal parameter. For example, gain $K_M$ is determined by totalizing the ratio of the process variable and the output of the process model when the gain of the process model is made to be 1. Then, dead time $L_M$ and first order lag coefficient $\beta_M$ are determined by using a repetition search method.

The FIG. 20 embodiment has the following advantages in comparison to the conventional device of FIG. 5. For example, the same manipulated variable as applied to real process 21, is simultaneously applied to process model 232. Thus, in the process model, accuracy of model output calculation is substantially improved. As another advantage, in the signal route from the control operation means 20 to the model parameter search means 233, the signal from the control operation means 20 flows like the process to the high pass filter in both the real process side and the process model side. Thus, it is possible to set the high and low limits in the output, and to use a non-linear characteristic type of model for the process model. Another advantage is that since the calculation for searching the parameters is conducted accordance with the calculation instruction signal applied from the calculation instruction means, the amount of calculations is reduced as a whole.

The foregoing description is illustrative of the principles of the invention. Numerous extensions and modification thereof would be apparent to the worker skilled in the art. All such extensions and modifications are to be considered to be within the spirit and scope of the invention.

What is claimed is:

1. A self-adaptive controller using an internal process model, comprising
   means for generating process variable and set value;
   control operation means of calculating a manipulated variable which is to be applied to a process based on said process variable and set value;
   data gathering means for gathering a set of time series data from said manipulated variable and a set of time series data from said process variable for a predetermined period;
   modeling means, including a process model, for correcting the internal parameters of said set of time series data of said manipulated variable so that an output of said process model matches said set of times series data of said process variable;
   estimation accuracy operating means for calculating the accuracy of said process model;
   calculation instruction means for generating calculation instructions when changes of said process variable from a process and said manipulated variable from said control operation means exceed predetermined values;
   means for starting said modeling means in accordance with the calculation instructions from said calculation instruction means; and
   means for obtaining control operation parameters of said control operation means based on the outputs of said modeling means and said estimation accuracy operating means.

2. The device of claim 1, wherein said internal parameters comprise gain constant; and comprises means for calculating dead time and first order lag coefficient of said process model are based on the output of said process model and said process variable when said gain constant is made to be 1.

3. The device of claim 1, wherein said modeling means uses a simplex method to adjust each internal parameter of said process model, in which length of component side which comprises an initial polygon is made longer than sampling period in said data gathering means.

4. The device of claim 1, wherein said modeling means uses a simplex method to adjust each internal parameter of said process model, in which an initial polygon is remade at least once at the original coordinate when said internal parameters are settled by said simplex method.

5. A process control device, comprising
   control operation means wherein process variable and set value are inputted and based thereon, manipulated variable to be applied to a process is calculated;
   data gathering means which gathers said manipulated variable and said process variable for a predetermined period;
   step input generating means which applies a step input to said process;
   first monitoring means which monitors a first time width until said process variable changes to a first fixed level;
   sampling period calculating means, wherein sampling period is made a value of said first time width and said process variable is sampled by said data gathering means at said sampling period;
   second monitoring means which monitors a second time width until said process variable changes to a second fixed level higher than said first fixed level;
   sampling period correcting means which corrects, based on said first time width and said second time width, a sampling period calculated by said sampling period calculating means;
   modeling means which calculates, based on process data gathered by said data gathering means, control parameters by use of said process model; and
   wherein at the beginning of control, a step like manipulated variable is applied to the process by said step input generating means and control operation parameters are calculated by said model means based on time series data.

6. A process control device, comprising
   control operation means wherein, at least, proportional operation and integral operation are applied to a deviation signal between process variable from a process and target control value and an obtained manipulated variable is outputted to said process;
   data gathering means which gathers said, manipulated variable and said process variable for a predetermined period;
   modeling means including a process model, wherein said process variable and said manipulated variable gathered by said data gathering means are inputted and process dynamic characteristic is estimated based on response waveform thereof;
   control operation parameter operating means wherein control operation parameters are calculated based on estimated result of said process dynamic characteristic obtained by said modeling means and set in said control operation means;

step input generating means wherein, at an automatic control state, a step signal having a fixed time width is applied to the output of said control operation means;

calculation instruction means wherein said process variable from a process and said manipulated variable from said control operation means are inputted and calculation instruction is generated when change of each signal exceeds a predetermined value; and wherein said data gathering means applies gathered data to modeling means in accordance with the calculation instruction from said calculation instruction means and said modeling means and said control operation parameter operating means are started in accordance with the calculation instruction from said calculation instruction means.

7. A control device, comprising control operation means wherein, at least, proportional operation and integral operation are applied to a deviation signal between a process variable from a process and a target control value and an obtained manipulated variable is outputted to said process;

process model simulating said process to which the manipulated variable output signal from said control operation means is applied, wherein internal parameters are made changeable;

first band pass filter to which a signal from said process model is applied;

second band pass filter having the same characteristic as that of said first band pass filter, to which a signal from said process is applied;

calculation instruction means to which a signal from said process and a signal from said second band pass filter are applied, wherein search for parameters by which the difference between signals from said first and second band pass filters are made to be minimum, is conducted in response to the calculation instruction from said calculation instruction means and the parameters of said process model are made changeable based on the search result;

control operation parameter operating means which calculates control operation parameters based on the search result by said process model parameter search means and sets these parameters in said control operation means; and wherein said process model, said first band pass filter, said model parameter search means and control operation parameter operating means are started in accordance with calculation instruction applied from said calculation instruction means.

* * * * *